(12) United States Patent
Squillante

(10) Patent No.: US 7,184,970 B1
(45) Date of Patent: Feb. 27, 2007

(54) OPERATING ON-LINE COMMUNITIES USING A COMPUTER NETWORK WITH AN EXTENSIBLE INFORMATION PUBLISHING ARCHITECTURE

(75) Inventor: Neil J. Squillante, New York, NY (US)

(73) Assignee: PeerViews Inc., New York, NY (US)

( * ) Notice: Subject to any disclaimer, the term of this patent is extended or adjusted under 35 U.S.C. 154(b) by 747 days.

(21) Appl. No.: 09/565,366

(22) Filed: May 5, 2000

Related U.S. Application Data

(60) Provisional application No. 60/132,789, filed on May 6, 1999.

(51) Int. Cl.
*G06Q 30/00* (2006.01)

(52) U.S. Cl. ...................................................... 705/14

(58) Field of Classification Search .................. 705/14
See application file for complete search history.

(56) References Cited

U.S. PATENT DOCUMENTS

| | | | |
|---|---|---|---|
| 4,799,156 A | | 1/1989 | Shavit et al. |
| 5,721,827 A | * | 2/1998 | Logan et al. ............... 709/217 |
| 5,864,684 A | | 1/1999 | Nielsen |

OTHER PUBLICATIONS

Definiton of "email", Microsoft Press Computer Dictionary, 3rd ed. (Redmond WA: Microsoft Corp., 1997).*
Definition of "content", Merriam-Webster's Collegiate Online Dictionary at http://www.search.eb.com/dictionary, Aug. 14, 2003.*
Armstrong et al., "The Real Value of ON-LINE Communities", Harvard Business Review, May-Jun. 1996, pp. 134-141..
Spar et al., "The Net", Harvard Business Review, May-Jun. 1996, pp. 125-133.
Cohen, A., "Listservers Create Communities, Controversy On-Line", New York Law Journal, Aug. 11, 1997, pp. S5, S8, S9.
Alvarez, G., "TechnoLawyer", www.legalresearcher.com, Aug. 18-24, 1997.
"The Listserv Review", Internet Law Researcher, Mar. 1998.
"TechnoPost Writing Competition", www.technolawyer.com, Mar. 10, 1999.
Kallas, C., "The Lowdown on Listservs; Interactive Uses of the Internet: From E-mail to Intranets and Beyond", Law Firm Partnership and Benefits Report, Jan. 1998; pp. 6-11.
"Lyris Email List Server", Lyris Technologies Inc., www.lyris.com, May 5, 1999.
"University of Washington Listprocessor", http://lists.u.washington.edu, May 5, 1999.
Pages from Website, www.lifeminders.com, May 1, 2000.

* cited by examiner

*Primary Examiner*—Donald L. Champagne
(74) *Attorney, Agent, or Firm*—Fish & Richardson P.C.

(57) ABSTRACT

A publishing system is disclosed that can provide direct marketing advertising together with material generated by members of an on-line community, editorial content or material generated by special guests. Individualized electronic mail messages addressed to members of an on-line community can be generated. Each individualized electronic mail message includes information from one or more of advertising submitted by vendors via electronic mail, electronic mail messages received from community members and special guests, and editorial content. The information included in a particular individualized electronic mail message depends on values assigned to the messages from community members, to the advertising from vendors and to the editorial content. The assigned values are indicative of the relevance of the community member messages, the advertising and editorial content, respectively, to particular segments of the on-line community. The information included in the particular individualized electronic mail message also depends on data previously provided by a community member to whom the particular individualized electronic mail message is addressed.

36 Claims, 11 Drawing Sheets

300

Command Center

Back | Forward | Stop | Refresh | Favorites | Preferences

Account Status      Help
List Address [ aturing@peerviews.com ]
- ● Plain Text
- ○ HTML
- ○ Suspend Service   [ Change ]

Click here to deactivate account

Subcommunities
- [X] Subcommunity #1
- [ ] Subcommunity #2
- [X] Subcommunity #3   [ Change ]

Member-Generated Content
- ● Topical Digests
- ○ Daily Digest
- ○ None   [ Change ]

Editorial Programs
- [X] Editorial Program #1
- [ ] Editorial Program #2
- [X] Editorial Program #3
- [X] Editorial Program #4
- [X] Editorial Program #5
- [ ] Editorial Program #6
- [X] Editorial Program #7
- [X] Editorial Program #8
- [X] Editorial Program #9
- [X] Vendor-Generated Content
- [ ] Subscribe to All Programs

[ Change ]

E-Mail Classifieds
- ● Send
- ○ Do Not Send   [ Change ]

Click here to place classified ad

PeerViews Mail
You have [ 5 ] new messages.

Name [ ]
Password [ ]

[ Submit ]

Community Archive
Search [ ]
Advanced Search
This Week's Messages
Last Week's Messages
Top 100 Messages   [ Submit ]

Product & Services Directory
Search [ ]
Advanced Search
This Week's Entries   [ Submit ]

PeerList.com Mailing Lists
List #1
List #2
List #3

Click here to create new list

Continuing Education Seminars
Seminar #1
Seminar #2
Seminar #3

Click here for complete list of e-seminars

Community Links
TechnoRelease Tuesday
Frequently Asked Questions
Contact Community Managers

Your ViewPoints    35
Recommendations:
3/29/99 – 4/4/99

[ ] Book Title

~~$17.99~~
$12.99

Book Cover

Jason Kelly will spend this Wednesday in The TechnoLawyer Community

[X] Software Title

~~$69.99~~
$49.99

Software Box

Peter Norton will spend this Thursday in The TechnoLawyer Community

[X] Apply points to purchase
Previous Recommendations

[ Purchase ]

Advertisement

FIG. 3A

OPERATING ON-LINE COMMUNITIES USING A COMPUTER NETWORK WITH AN EXTENSIBLE INFORMATION PUBLISHING ARCHITECTURE

CROSS-REFERENCE TO RELATED APPLICATIONS

This application claims the benefit of priority of U.S. Provisional Application No. 60/132,789, filed May 6, 1999.

BACKGROUND

The present invention relates generally to operating direct marketing environments that blend direct response advertising with content ("on-line communities") using a computer network in conjunction with an extensible information publishing architecture.

The Internet is a global computer network based on a non-proprietary group of technologies (e.g., TCP/IP, e-mail, HTML) that collectively serve as an important tool for gaining access to information on a wide variety of subjects. With the proliferation of computers in business as well as personal contexts, the Internet has become an attractive medium for commercial enterprises.

Internet companies typically publish information, sell goods, provide services, or engage in some combination thereof. Internet companies generate revenue in one of four ways. First, they can sell subscriptions or usage fees (e.g., customers can pay a fee to receive or access information). Second, they can sell advertising. Third, they can sell their own goods and/or services. Fourth, they can sell goods and/or services developed by other companies and receive commissions. The third and fourth methods of generating revenue are collectively referred to as "e-commerce" in the Internet vernacular.

The sources of revenue discussed above—subscriptions, advertising, and e-commerce—are sound at their most basic level. However, few Internet companies have been able to profit from them. This high rate of failure stems from a deep-rooted fatal flaw—over-reliance on the World Wide Web (the "Web"), particularly with respect to the development and implementation of on-line communities.

The Web consists of a vast network of interconnected electronic pages, which can contain formatted text, graphics, photographs, sound, movies, and animation. The feature that sets the Web apart from other forms of media is the hypertext link. Hypertext links, which appear most often on a Web page as buttons or underlined text, allow users to jump from one Web page to another one by simply clicking on them with a computer mouse or other input device.

Despite a few success stories, most attempts to transform Web sites into on-line communities have failed for several reasons. First, the Web is not yet an effective medium for advertising. Internet companies derive a large percentage of their advertising revenue from Web banners, which are billboard-like images with embedded hypertext links that are placed on the top, bottom, and sides of Web pages. Unlike the print, radio, and television advertisements that have become a staple of our society, Web banners have declined in perceived value over the years. Many advertisers have criticized Web banners as being overpriced and ineffective.

Second, to combat falling Web banner prices, many companies have attempted to transform Web banners into a form of direct marketing. To provide the kind of targeting required for direct marketing, however, those companies must implement expensive and complex technology that matches on-line information with so-called "off-line information," such as name, address and other date. Thus far, efforts to transform Web banners into a direct response medium have met with stiff resistance from privacy groups and even politicians. The privacy problem stems from the fact that this form of direct marketing occurs without the consent or knowledge of the people at whom the advertising is directed.

Third, the Web is not an inherently interactive medium with respect to one-to-one and many-to-many communication, two of the hallmarks of successful on-line communities (the other being one-to-many communication). Internet companies have correctly focused their attention on the concept of "community," but they have dropped the ball with respect to implementation. They mistakenly believe that by adding interactive elements (primarily bulletin boards) to their Web sites, people will congregate and form communities. The Web was originally designed as a way to publish complex documents and allow people to access and navigate through those documents quickly and easily. The Web was not designed to accommodate the exchange of information throughout the day by many different people, most of whom are not employed by the owner of a given Web site.

Fourth, the Web is a passive medium. Companies that rely heavily on the Web must wait passively for patrons to return to their bulletin boards. A patron who never returns ceases to be a patron. Some companies have begun sending reminder e-mail messages to their patrons, but because these companies rely so heavily on the Web, they cannot get away with sending such reminders very often.

Fifth, the Web has led many companies astray from their purported goal of developing on-line communities. Thanks to the Web's robust technical environment, some Internet companies act more like technology companies than media companies. They become fixated on extending the Web's capabilities and lose sight of the fact that technology is a means to an end and not an end in itself. Other Internet companies act more like traditional publishers than interactive media pioneers because of the Web's strength as a one-to-many publishing platform. They create or purchase 95% or more of the material they publish and neglect the development of member-generated content, which is so crucial to a successful on-line community. The failings of the companies involved in this dichotomy stem from the same cause—a failure to put into place the infrastructure, rules, incentives and management needed to foster the development of real on-line communities.

SUMMARY

In general, a publishing system is disclosed that can provide direct marketing and other advertising together with material generated, for example, by members of an on-line community, editorial content or material generated by special guests.

According to one aspect, individualized electronic mail messages addressed to members of an on-line community are generated. Each individualized electronic mail message includes information from one or more of advertising submitted by vendors via electronic mail, electronic mail messages received from community members or special guests, and editorial content. The information included in a particular individualized electronic mail message depends on values assigned to the messages from community members and special guests, values assigned to the advertising from vendors and values assigned to the editorial content. The assigned values are indicative of the relevance of the community member messages, the advertising and editorial content, respectively, to particular segments of the on-line community. The information included in the particular individualized electronic mail message also depends on data previously provided by a community member to whom the particular individualized electronic mail message is addressed.

According to another aspect, an on-line publishing system includes a computer network having network access devices, an electronic mail server, and a database. Community members can submit member-generated messages by electronic mail and vendors can submit advertising by electronic mail. The network is configured to pass the member-generated messages and the advertising to the electronic mail server which is configured to pass the member-generated messages and the advertising to the database for storage therein.

A community manager can review and assign values to the member-generated messages and the advertising stored in the database, and can assign values to editorial content stored in the database. The assigned values are indicative of the relevance of the member-generated messages, the advertising and the editorial content, respectively, to particular segments of an on-line community. The database is configured to generate individualized electronic mail messages addressed to community members.

In various implementations, one or more of the following features can be present. The individualized electronic mail messages collectively can include information from the advertising, the member-generated messages and the editorial content. At least some of the individualized electronic mail messages can include information from the advertising as well as information from at least one of either the editorial content or the member-generated messages. Additionally, information from special-guest messages submitted by electronic mail also can be included in the individualized electronic mail messages.

In general, the database can be configured to determine what information is included in a particular individualized electronic mail message by matching the assigned values with the data previously provided by the community member to whom the particular individualized electronic mail message is addressed.

A personal Web page can be provided to each community member from which one can control the general nature of the information that is to be included in the individualized electronic mail message to that community member.

In some implementations, the database can be configured to award a predetermined number of points to a particular community member if information from an electronic mail message submitted by that community member is accepted for publication or syndication. The community manager can offer products and services for sale to the community members, and a particular community member can use previously-accumulated points toward the purchase of the products or services. The database can be configured to adjust a price for a particular product or service as the number of purchases of the particular product or service by community members increases. Community members can initiate and complete a purchase via electronic mail and can apply previously-accumulated points toward the purchase via electronic mail.

Additionally, information included in individualized electronic mail messages previously distributed to community members can be archived. Community members can subscribe and obtain access to the archived information. In some implementations, vendors may be required to pay a subscription price for the privilege of submitting advertising for review by the community manager. Additionally, in some cases, information from member-generated messages can be syndicated.

In some implementations, one or more of the following advantages may be present. For example, each on-line community can attract demographically desirable professionals or enthusiasts who appeal to advertisers. Community members contribute much of the original content and, therefore, regard the advertisements they receive as more editorial than promotional. Each community can be operated by a staff of one ore more community managers who have expertise in the subject matter of the community.

A new publishing paradigm, new forms of Internet advertising, and a new e-commerce methodology are disclosed. The result can be an improved technique for generating revenue from on-line communities. For example, the present approach, which relies more heavily on the use of e-mail, does not suffer from the passive nature of a Web-centric approach. The community managers of an on-line community that relies more heavily on e-mail can initiate contact with community members whenever they wish. In addition, publishing information via e-mail to persons who have voluntarily joined a particular on-line community and provided demographic data about themselves can reduce privacy concerns and can improve the possibilities for generating revenue.

Other features and advantages will be readily apparent from the detailed description, the accompanying drawings, and the claims.

BRIEF DESCRIPTION OF THE DRAWINGS

FIG. 3A illustrates an exemplary command center by which community members can control their on-line community experience and make purchases.

DETAILED DESCRIPTION

The business model described in greater detail below can operate, for example, on the Internet through a computer network. The business model includes an extensible information publishing architecture from which one can develop on-line communities that avoid many of the problems that plague on-line communities relying primarily on the Web. The extensible information publishing architecture can include information components, each of which serves one or more of the three cornerstones of a successful on-line community—administration, content, and revenue.

As described below, an on-line community revolves primarily around e-mail in the form of Internet mailing lists generated dynamically from a database. E-mail is an inherently interactive medium perfectly suited for exchanging information between two people and among many people who share a common interest. Although the Web receives the most media coverage, it ranks second behind e-mail in terms of popularity. E-mail is an asynchronous form of communication that works as follows. The sender uses an e-mail program to compose a text message, summarize the content of the message with a subject, and address the message to one or more recipients. Using known technology, the message is sent to the recipient's computer address. The recipient's computer receives the message and stores it in an "in-box." At some later time, the recipient can read, delete, reply, forward, redirect, file, or otherwise process the message.

An Internet mailing list allows one or more people to send an e-mail message to a group of people without having to enter multiple e-mail addresses. Internet mailing lists require special e-mail server software to process and distribute e-mail messages automatically. Unlike other Internet technologies, however, Internet mailing lists do not require special software on the client (user) side. After joining an on-line community that revolves around one or more Internet mailing lists, community members receive material automatically via e-mail. They need not install special software and need not chase after the material themselves.

Figure 1:
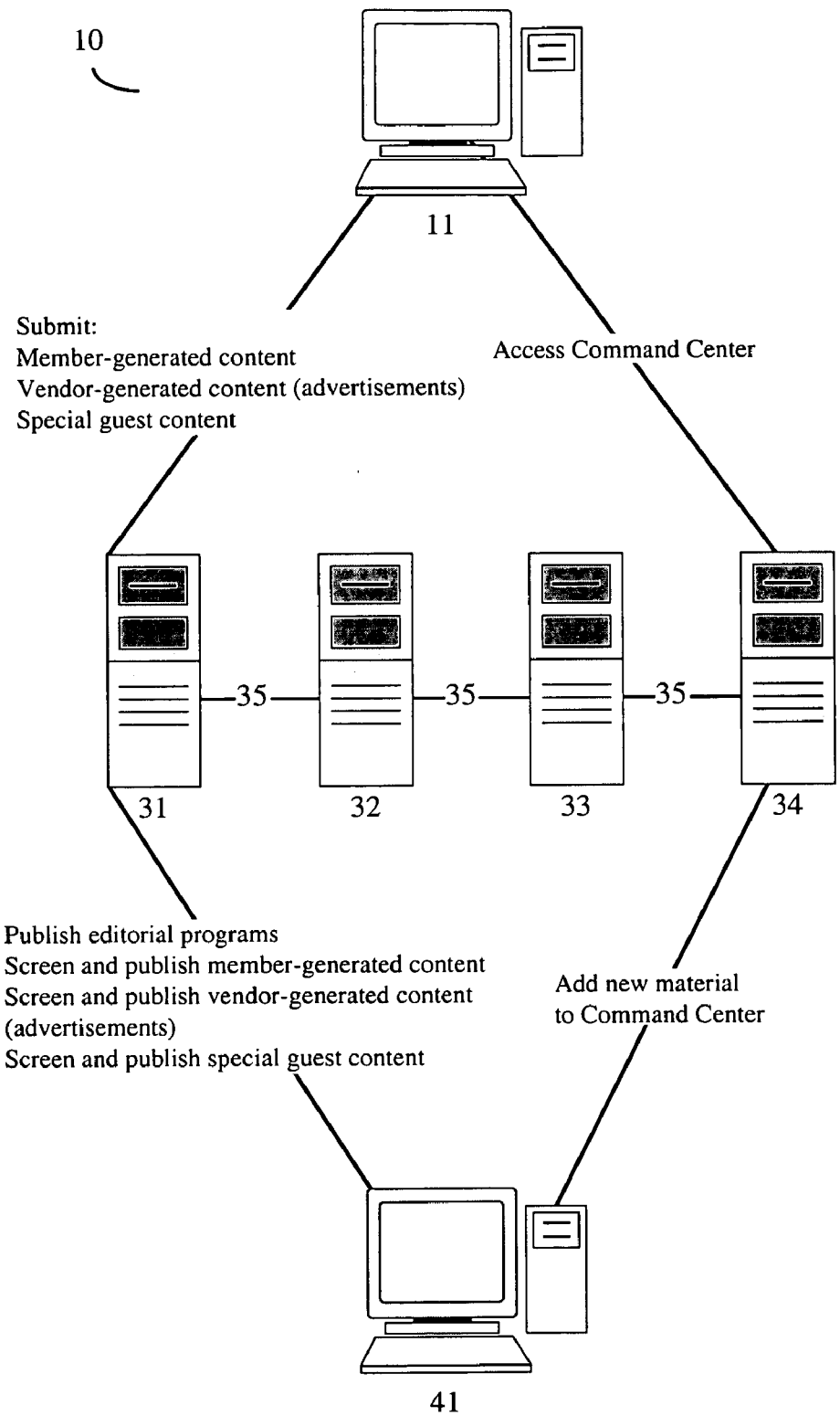
FIG. 1 illustrates an exemplary communication network for implementing the invention.

1. The Computer Network Underlying the Extensible Information Publishing Architecture As shown in FIG. 1, a computer network 10 underlying the extensible information publishing architecture 400 of an on-line community includes Internet-enabled network access devices 11, 41, and various network servers 31, 32, 33, 34. The network servers at the core of the computer network 10 have one or more e-mail servers 31, one or more database servers 32, one or more transaction servers 33, and one or more Web servers 34. The network servers 31, 32, 33, 34 contain and are linked by software 35.

The Internet-enabled network access devices 11 include computer systems or other devices operated, for example, by community members, community special guests, and community participating vendors. The Internet-enabled network access devices 41 include computer systems or other devices operated by community managers. These Internet-enabled network access devices 11, 41 can include independent computers as well as computers that are part of a local or wide area network. Other Internet-enabled network access devices 11, 41 include wireless telephones, handheld computers, personal digital assistants, and other interactive Internet devices.

A person in an on-line community seeking to communicate over the computer network 10 can use a network access device 11. Network communication can be accomplished over a medium such as a combination of public switched telephone network dial-up connections and packet network interconnections (i.e., the Internet). Network access devices 11 can connect through dial-up, direct cable access, wireless, satellite, or other communication technologies. Persons seeking to communicate over the computer network 10 can include community members, community special guests, and community participating vendors.

Using one or more network access devices 41, community managers can screen and assign values to communications sent from network access devices 11 through the computer network 10 before those communications are distributed to other network access devices 11 on the computer network 10. The assigned values are indicative of the relevance of the communication to particular segments of the community.

The network servers 31, 32, 33, 34 can have both dial-up and packet network interfaces, thereby enabling them to receive data from the network access devices 11, 41, segment received data into data packet segments, add additional information to the segments, and send the resultant data packets. The network servers 31, 32, 33, 34 also can be implemented as a network service provider's point-of-presence (POP).

Figure 1A:
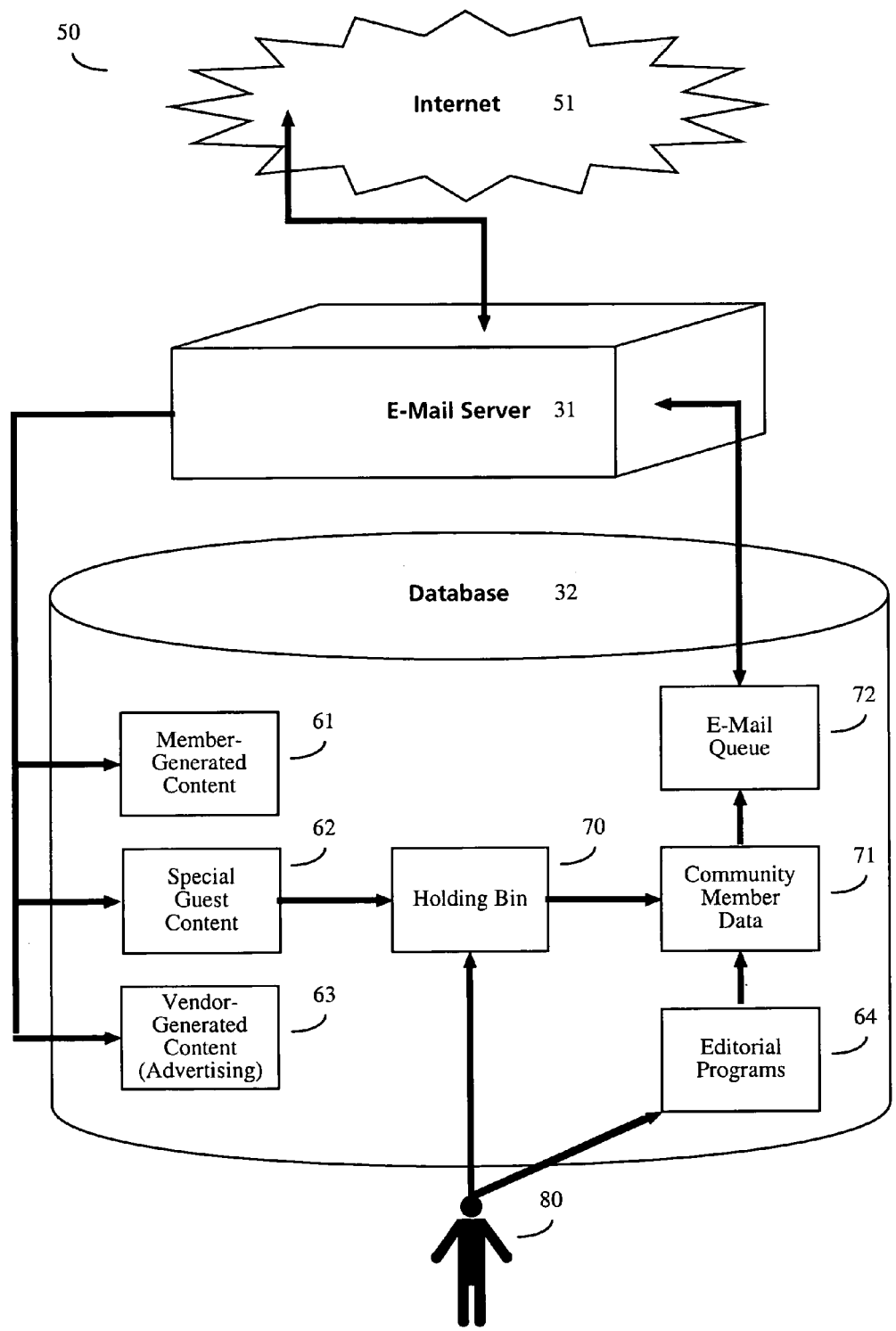
FIG. 1A illustrates exemplary e-mail and database servers according to the invention.

FIG. 1A depicts an e-mail database system 50 responsible for distributing an on-line community's member-generated content 61, special guest content 62, vendor-generated content 63 such as advertising, and editorial programs 64 through the computer network 10. In general, member-generated content includes material written and submitted by community members, in other words, people who have joined the on-line community, and interested others. Special-guest content includes material written and submitted by people who have been invited to participate in the on-line community for a specified period of time to discuss a special achievement or a field in which they have expertise. Vendor-generated content includes advertising material written and submitted by vendors that have purchased an advertising package with regard to an on-line community. In this application, the terms "vendor-generated content" and "advertising" are synonymous and used interchangeably.

A person in the on-line community can use an Internet-enabled network access device 11 to send member-generated content 61 in the form of an e-mail message to the e-mail server 31. The e-mail server 31 then sends the member-generated content 61 to a holding bin 70 within a database 32. Special guest content 62 and vendor-generated content 63 enter this holding bin 70 in a similar fashion. Using a network access device 41, a community manager 80 can review and assign values to the member-generated content 61, special guest content 62, and vendor-generated content 63 in the holding bin 32. The assigned values are indicative of the relevance of the content to various segments of the on-line community.

Once values are assigned, the database 32 creates e-mail messages by matching the assigned values with community member data 71 that members of the on-line community have voluntarily provided. The resulting messages are unique to each community member and may include a combination of member-generated content 61 and vendor-generated content 63, a combination of special guest content 62 and vendor-generated content 63, or vendor-generated content 63 alone. These e-mail messages are placed in an e-mail queue 72, which periodically is checked by the e-mail server 31. When the e-mail server 31 detects e-mail messages in the e-mail queue 72, it distributes them to the appropriate community members.

The process for distributing editorial programs 64 is similar to that for distributing member-generated content 61, special guest content 62, and vendor-generated content 63 except that the community manager 80 initially prepares the editorial programs 64. Once an editorial program 64 has been prepared, the community manager 80 uses a network access device 41 to place it in the database 32 and assign values. Once values are assigned, the database 32 creates e-mail messages by matching these values with community member data 71 that members of the on-line community have voluntarily provided. The resulting messages are unique to each community member and consist of an editorial program 64 and vendor-generated content 63. The e-mail messages are placed in an e-mail queue 72, which periodically is checked by the e-mail server 31. When the e-mail server 31 detects e-mail messages in the e-mail queue 72, it distributes them accordingly.

Computer-executable instructions for implementing the techniques described here can be stored on a computer-readable medium such as a magnetic floppy disk, magnetic tape, or compact disc read only memory (CD-ROM).

Figure 1B:
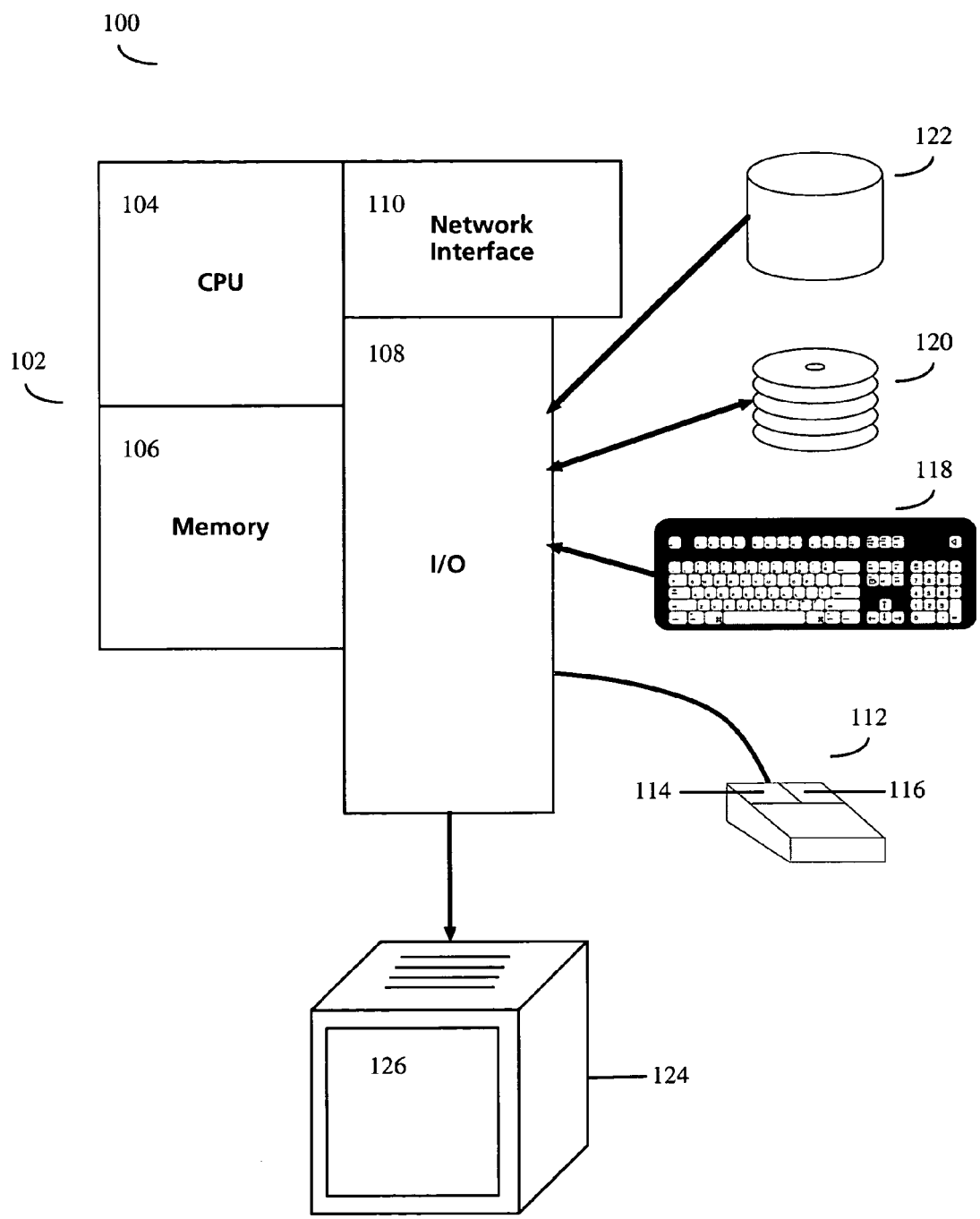
FIG. 1B illustrates an exemplary network access device.

FIG. 1B illustrates various components of an exemplary computer system 100 that is configured to serve as one of the network access devices 11, 41. The computer system 100 has a processor 102 that includes a central processing unit (CPU) 104 and memory 106. The processor 102 can be a conventional, general purpose, single- or multi-chip microprocessor. In addition, the processor 102 can be a conventional special purpose microprocessor, such as a digital signal processor or a graphics processor. The processor 102 also includes an input/output (I/O) section 108. The I/O section 108 is coupled to a pointing device 112, a keyboard 118, a disk storage unit 120, a CD-ROM or DVD-ROM drive unit 122, and a display unit 124. The disk storage unit 120 and the CD-ROM or DVD-ROM drive unit 122 contribute to the storage of files that allow the computer to access data and receive, send and process e-mail messages. The system also has a network interface 110 to provide access to a network, such as the Internet.

The pointing device 112 is responsive to a user's input and moves an indicator on the display screen 126. The pointing device 112 can be activated by pushing one or more buttons 114, 116 associated with the pointing device. If the pointing device 112 is activated while the indicator points to a selectable control area of the display screen 126, a command or computer operation associated with the selectable control area is invoked.

The network access device 11 used by a person in an on-line community and the network access device 41 used by a community manager can also be implemented, for example, as a computer system similar to that shown in FIG. 1B.

2. Joining an On-line Community

Figure 2:
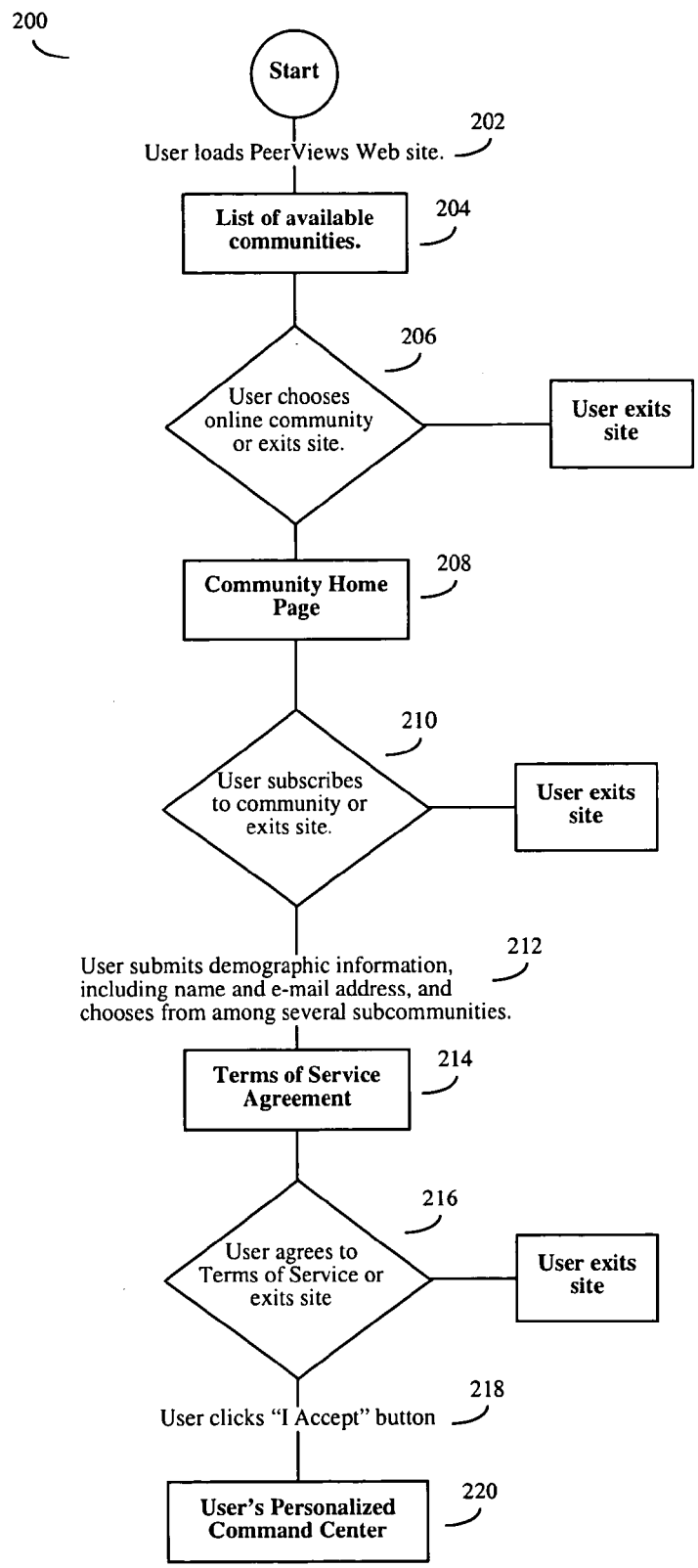
FIG. 2 is a flow chart that illustrates the process of joining an on-line community developed in accordance with the invention.

FIG. 2 illustrates one method of joining an on-line community. A user loads 202 a Web site onto his network access device 11. Once the Web site is loaded, the user can view various information related to the Web site on the display screen 126 of his/her Internet-enabled network access device 11. The Web site displays 204 a list of available on-line communities. The user can choose 206 to enter an on-line community or exit the site. Choosing an on-line community brings up 208 a community home page. The home page allows 210 the user to subscribe to a community or exit the site. Subscribing to the community may require that the user submit 212 certain demographic or other information. Such demographic information can include the user's name and e-mail address. The user may also be directed to a screen that displays 214 terms of service agreement. The user can either agree 216 to the terms of service by using the pointing device 112 to click 218 a particular selectable control area of the screen 126 or exit the site.

If the user agrees to the terms of service, then the user's personalized command center is displayed 220. As previously noted and as explained in detail below, a community member's command center is a private and secure Web page from which community members can control various aspects of their on-line community experience and purchase products and services.

3. Command Center

Figure 3B:
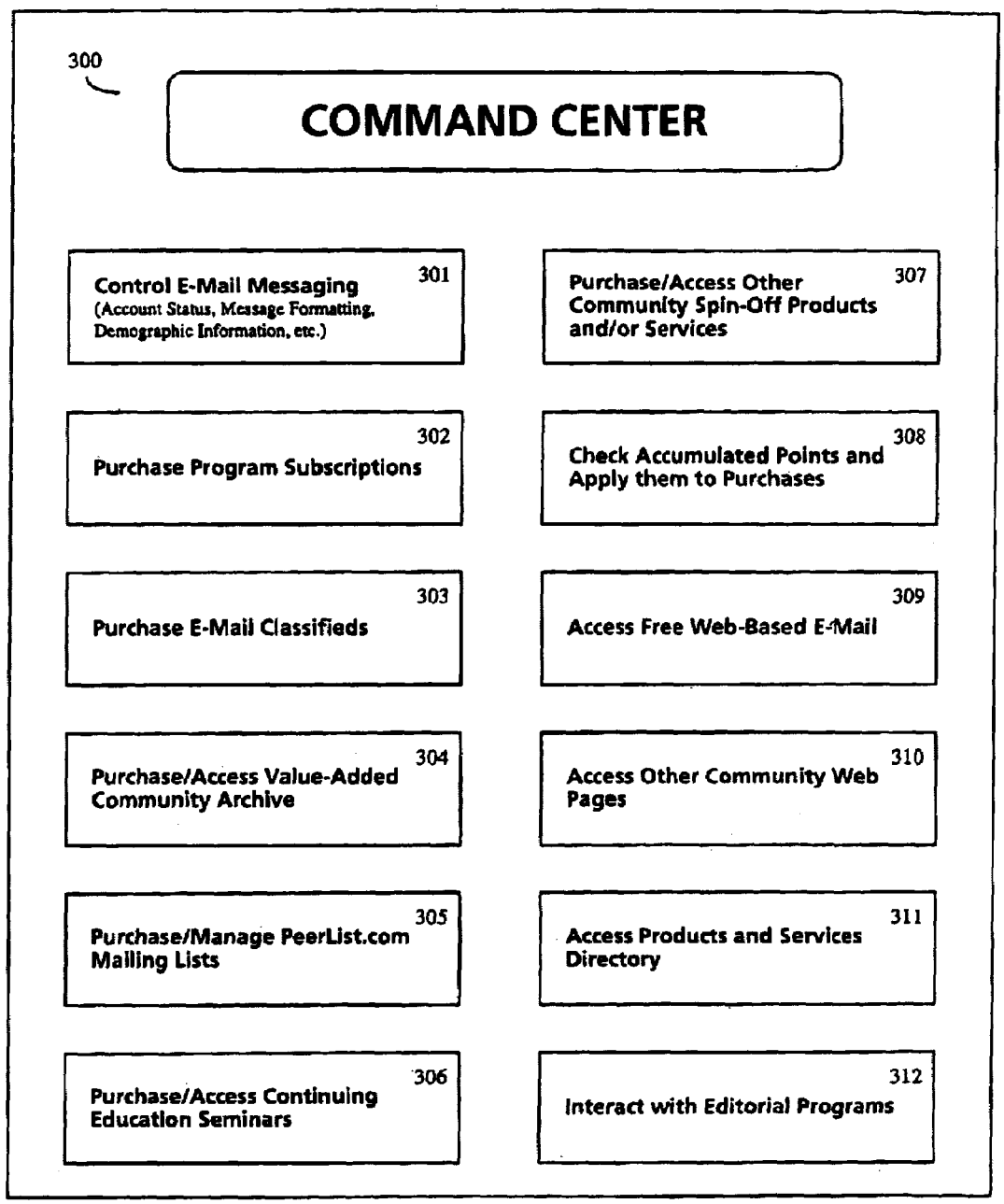
FIG. 3B is a block diagram of an exemplary command center.

Once people join an on-line community, they can use a network access device 11 in conjunction with the computer network 10 to access a private and secure Web page called the "command center" from which they can control various aspects of their on-line community experience and make purchases. A command center is generated through the computer network 10 by the software that works in conjunction with the network servers 31, 32, 33, 34. Community members view and interact with their respective command center 300 on the display screen 126 of their network access device 11. FIG. 3A illustrates an exemplary command center 300 as it might actually appear to community members. FIG. 3B features a block diagram with examples of how community members can use their respective command center 300. Each of these examples is discussed below.

Community members can use a network access device 11 to click on a graphical user interface 301 displayed on their command center 300 to control various aspects of e-mail messaging. For example, as FIG. 3A shows, they can change the e-mail address from which they subscribe, choose between plain text and HTML for message formatting, temporarily suspend service (for vacations, etc.), choose between a daily digest and individual messages for member-generated content, update their demographic information, deactivate their account, and much more.

Community members also can use a network access device 11 to click on a graphical user interface displayed on their command center 300 to: (1) purchase editorial program subscriptions 302; (2) purchase e-mail classified advertisements 303; (3) purchase and access value-added archives 304; (4) purchase and manage PeerList.com™ mailing lists 305; (5) purchase and access continuing education seminars 306; (6) purchase and access other community spin-off products and services 307; (7) check accumulated points and apply them to purchases 308; (8) access free Web-based e-mail 309; (9) access other community Web pages 310; (10) access a products and services directory 311; and (11) interact with editorial programs 312. These features are discussed in greater detail below.

4. Components of the Extensible Information Publishing Architecture

Figure 4:
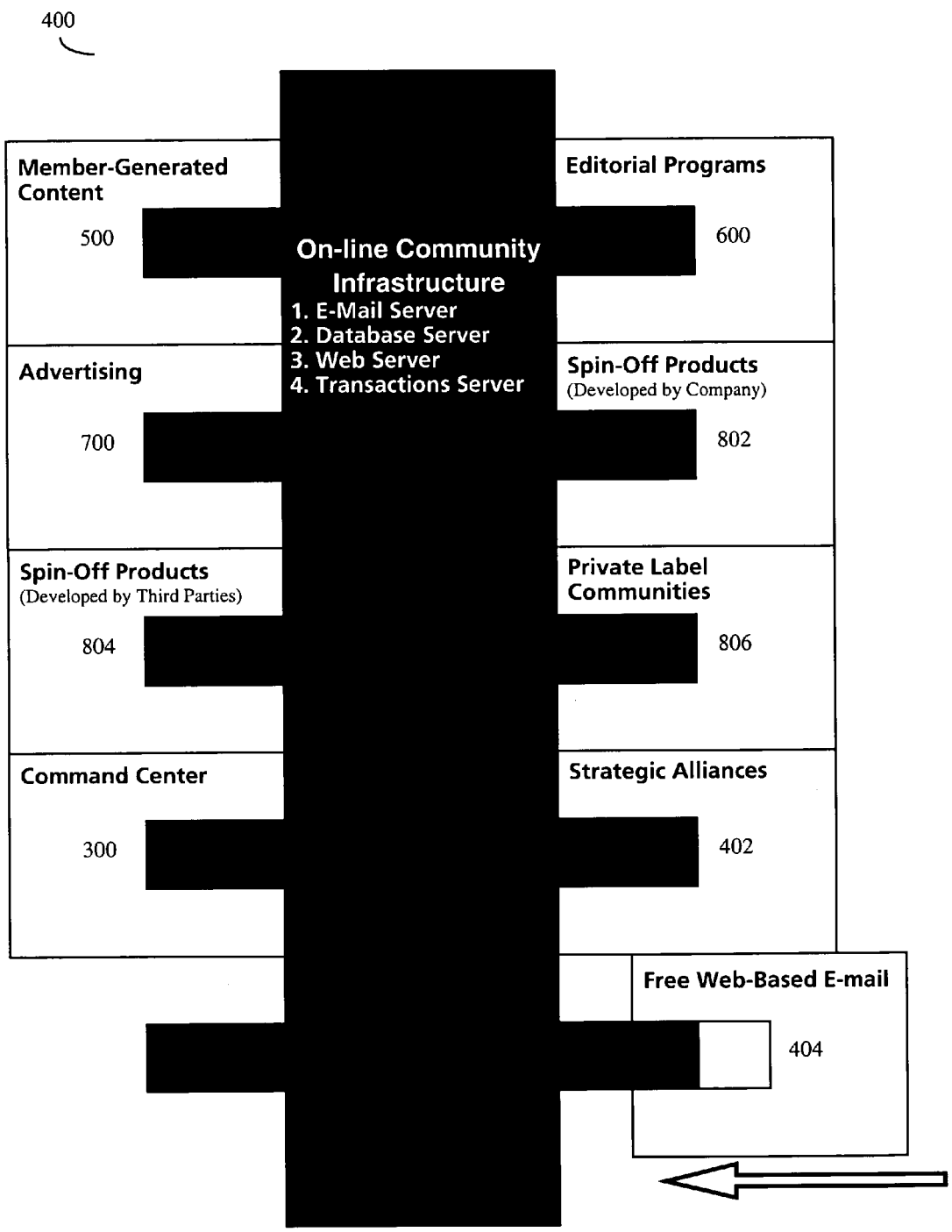
FIG. 4 illustrates the various components of the extensible information publishing architecture.

FIG. 4 illustrates various components of the extensible information publishing architecture, the publishing system used to create on-line communities. As noted above, the extensible information publishing architecture includes one or more e-mail servers 31, one or more database servers 32, one or more transactions servers 33, and one or more Web servers 34 that contain and are linked together by software 35. By plugging a number of information components into this architecture, community managers can build on-line communities. Because the architecture is extensible, there is no limit on the number or type of information components that can be integrated into the publishing system.

The extensible information publishing architecture can include: (1) content components, such as member-generated content 500 and editorial programs 600; (2) revenue components, such as advertising 700, spin-off products and services developed by the community management team 802, spin-off products and services developed by or in conjunction with third parties 804, and private label communities 806 operated in conjunction with third parties; and (3) administrative components, such as the command center 300 and free Web-based e-mail 404 for community members. Some components are multifaceted and serve more than one function. For example, community managers can form strategic alliances 402 to generate content, revenue, or both. Similarly, the advertising component 700 can generate both content and revenue. As noted above, the extensible information publishing architecture can be extended to incorporate other components as well.

5. Member-Generated Content Components

Figure 5:
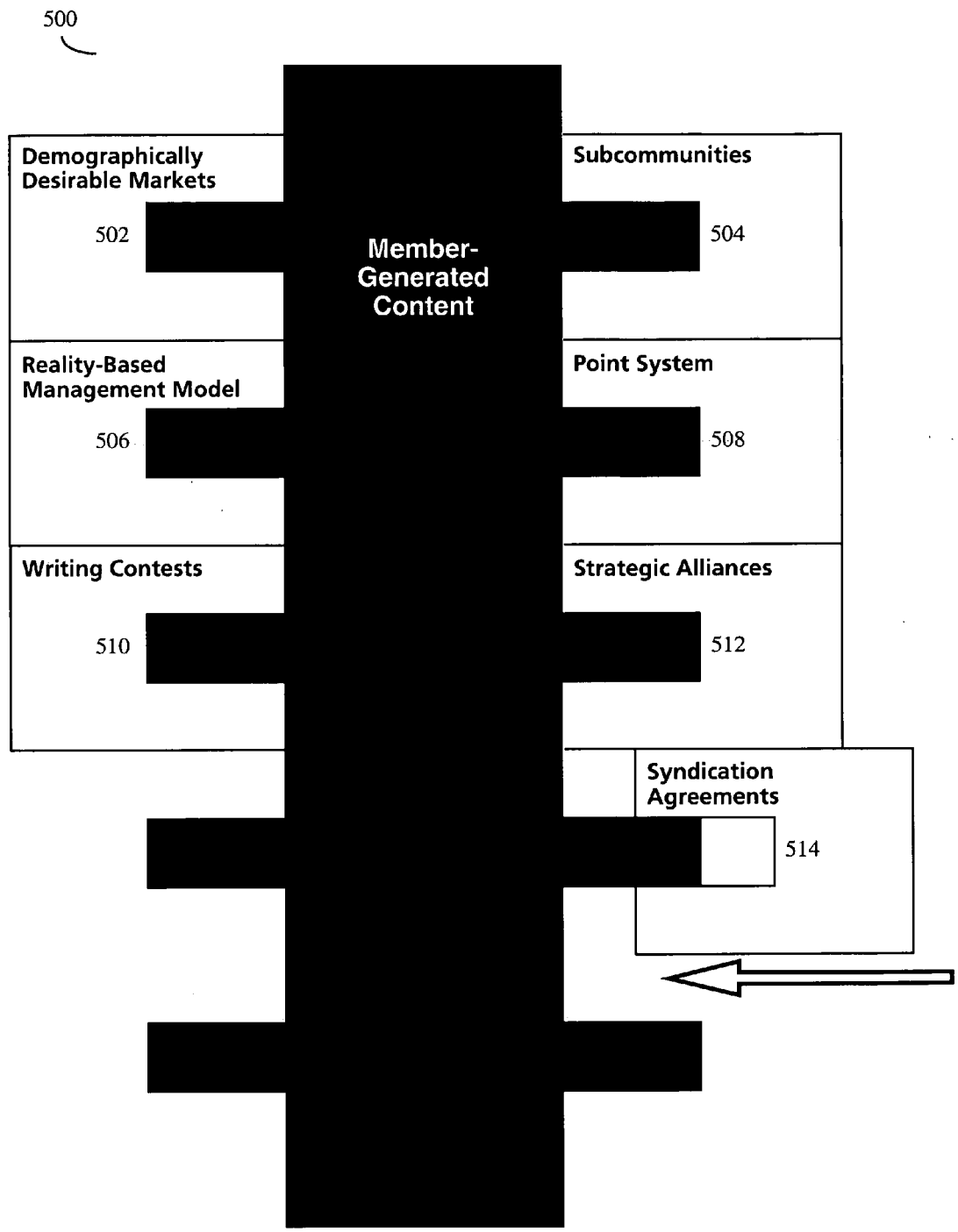
FIG. 5 illustrates exemplary components of the extensible information publishing architecture relating to member-generated content.

FIG. 5 illustrates exemplary components of the extensible information publishing architecture relating to member-generated content 500. Communities target demographically desirable markets 502 within business, consumer, educational, or other markets. These communities should be sufficiently narrow in scope yet achieve a critical mass with respect to size of audience. Examples of suitable markets include bankers, car enthusiasts, college students, computer game aficionados, day traders, doctors, financial planners, home improvement enthusiasts, information technology professionals, insurance brokers, legal professionals, real estate brokers, and small business owners.

The personal demographic information submitted by each member upon joining an on-line community can be used to identify different sub-markets within a community. The information can further help community managers and advertisers target community members most likely to find particular products or services appealing. In addition, this information can lead to the development of one or more sub-communities 504 to better serve a particular demographic market 502.

Most of the material published in an on-line community consists member-generated content 500, i.e., e-mail messages written by community members. This heavy reliance on member-generated content 500 can result in a wealth of information that cannot be found elsewhere. Many people find the opinions of their peers just as or even more helpful than the opinions of professional journalists.

To ensure the continuous production of high quality member-generated content, community managers can operate on-line communities in accordance with a reality-based management model 506, which takes its cue from real-world communities in that it implements a series of rules by which both community managers and community members must abide. Two of the most important rules are as follow: (1) members must limit their contributions to certain designated topics that change every week; and (2) members must post detailed messages that explore a given topic in considerable depth. The first of these rules, weekly discussion topics, creates a scarce resource. In the context of an on-line community, the short-lived nature of the weekly discussion topics increases the likelihood of a spirited discussion by community members during the time in which a particular topic is designated. As an added safeguard, community managers screen member-generated content 500 to ensure that it complies with specified standards, such as those listed above.

To further ensure the continuous production of high quality member-generated content 500, community managers can implement a number of incentives, including a point system 508, writing contests 510, strategic alliances 512 and syndication agreements 514. Community members can use a network access device 11 in conjunction with the computer network 10 to submit written material for approval and publication by a community manager. Community members receive a predetermined number of points for each submitted e-mail message that the community managers publish. The software 35 in conjunction with the network servers 31, 32, 33, 34 automatically records and assigns points as messages are published. Each point is worth a specified value that community members can use in lieu of traditional forms of payment for the purchase of editorial programs 600, classified e-mail advertisements 706, and community spin-off products and services 800. For example, if an on-line community offers a book 815 for sale, community members can apply accumulated points to the purchase of the book 815 by using a network access device 11 to click on a graphical user interface 308 displayed on their command center 300. If a balance exists over and above the accumulated points, the community member can supplement the points with other forms of accepted payment, such as a credit card.

In addition to receiving points for published e-mail messages, community members can also receive points when they win writing contests 510. Writing contests 510 can take many forms. For example, community managers can select one published e-mail message per week, transform it into an article suitable for professional publication, publish it on the community's corresponding Web site as an episode of The Masterpost 606, an editorial program 600, and/or in one or more magazines with which the community has strategic alliances 512 or syndication agreements 514. Regardless of the amount of editing and rewriting performed on these winning messages by community managers, community members receive all the credit. As a result, these writing contests 510 enable community members to become published authors without exerting much effort.

Strategic alliances 512 and syndication agreements 514 with magazines and other publications provide several benefits for on-line communities, including enhanced reputation and subscriber growth. They can also transform competitors into allies and allow both parties to tap into each other's content and talent pool. The scope of a strategic alliance 512 can include writing contests 510, and other forms of cross-publishing and cross-promotion. Such content-oriented strategic alliances 512 differ and are distinct from revenue-oriented strategic alliances 402 that involve the sale of community spin-off products and services 804.

6. Editorial Program Components

Although most of the material published in an on-line community consists of member-generated content 500, editorial content in the form of editorial programs 600 also plays an important role and serves as a complement to the member-generated content 500. Each of these editorial programs 600 can feature a unique brand name and descriptive slogan, thereby enabling community members to easily identify them. For the most part, community managers publish editorial programs 600 in the same manner as member-generated content—via e-mail through the computer network 10. Like television programs, the editorial programs 600 can be distributed according to a schedule. Some editorial programs 600 feature original material written by the community managers, some feature material contributed by community members or third parties and compiled by community managers, and some feature a blend of original and compiled material. A few editorial programs 600 have an audience participation component, such as a poll or a contest.

Community members can subscribe to one or more editorial programs 600 by using a network access device 11 to click on a graphical user interface 302 displayed on their command center 300. A subscription can require payment. Community members can purchase a subscription with a credit card or with some other form of electronic payment. Additionally, community members can apply their accumulated points 508 to such purchases. Regardless of which form of payment they use, community members can conduct this transaction using their private and secure command center 300.

Editorial programs 600 can generate revenue in ways other than through subscriptions. Community members can purchase the right to access and search a value-added community archive 810 by using a network access device 11 to click on a graphical user interface 804 displayed on their command center 300. A value-added archive 810, which is discussed in more detail below, includes a Web database that contains the material previously published in an on-line community, including editorial programs 600.

Figure 6:
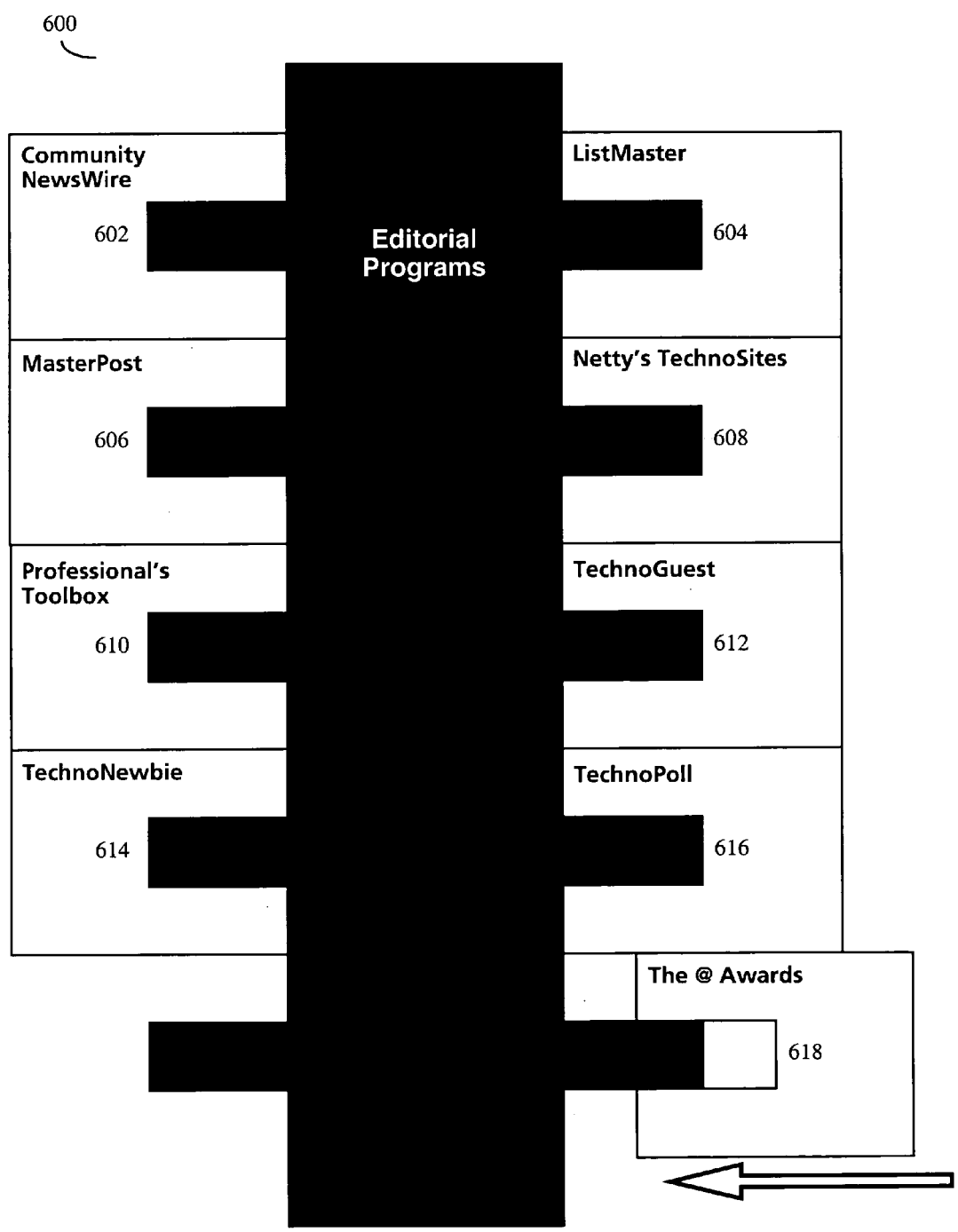
FIG. 6 illustrates exemplary components of the extensible information publishing architecture relating to editorial programs.

FIG. 6 lists examples of editorial programs 600, each of which is discussed in more detail below. Community managers can publish the various editorial programs 600 via e-mail using a network access device 41 in conjunction with the computer network 10. They also can publish them in third-party publications as a result of strategic alliances 512 and syndication agreements 514.

(a) Community NewsWire™ 602: This editorial program includes short, informative articles that cover breaking news of interest to community members.

(b) The ListMaster™ 604: This editorial program compiles or summarizes the best messages posted to other popular Internet mailing lists.

(c) MasterPost™ 606: MasterPost™ 606 is one of the writing contests 510 referred to above. Every week, the community managers select, edit, and publish what they consider the best post of the week, thereby transforming an e-mail message written by a community member into a professionally-written magazine article that can further be published in accordance with strategic alliances 512 and syndication agreements 514.

(d) Netty's TechnoSites™ 608: Periodically, a fictitious character named "Netty" reviews one or more Web sites of interest to the members of a particular on-line community using a colloquial writing style and many pop culture references. In addition to this written review, Netty gives each site 1–4 "@" symbols depending upon how well it complies with a set of Web site design principles.

(e) Professional's Toolbox™ 610: This editorial program discusses various technology products and/or services in the context of the ongoing story of a professional who faces various obstacles and overcomes them through the use of the products and/or services discussed in each episode.

(f) TechnoGuest™ 612: This editorial program works in conjunction with third party spin-off products and services 804 sold to community members. Instead of simply offering a community spin-off product or service 804 for sale, community managers can attempt to increase sales by inviting the creative force behind the spin-off product or service (e.g., author of a book, programmer of a software program, designer of a Web site) to spend a day in the on-line community. These special guests can publish anecdotes and other information about a spin-off product or service 804 and answer questions from community members. Special guests can submit their material for publication by using a network access device 11 in conjunction with the computer network 10.

(g) TechnoNewbie™ 614: The TechnoNewbie™ 614 is a program that caters to novices new to a particular field. For example, they can use analogies and anecdotes to make the material less technical and abstract.

(h) TechnoPoll™ 616: Periodically, community managers can create a poll that includes a number of questions relating to issues, products, and services of interest to the members of a particular on-line community. Community members have a limited period of time during which they can vote. To cast a ballot, community members can use a network access device 11 to click on a graphical user interface 312 displayed on their command center 300. When the voting ends, the community managers publish the results of the TechnoPoll™ 616 via e-mail using a network access device 41 in conjunction with the computer network 10. Instead of merely listing the raw numbers, the TechnoPoll™ 616 can contain commentary on the results and on the issues raised by each question.

(i) @ Awards™ 618: An on-line community can sponsor its own @ Awards 618, an annual awards ceremony conducted by community managers in a chat room on the Web. During the month of December, for example, community members can vote electronically for their favorite products and services in various categories by using a network access device 11 to click on a graphical user interface 312 displayed on their command center 300. During this time, community managers can choose winners of special achievement awards. The ensuing awards ceremony takes place, for example, in January and includes an interactive writing exercise in which community managers announce the winners using a carefully crafted screenplay, executives from the winning companies make prepared acceptance speeches, and spectators cheer using a combination of words and symbols. The end result of the awards ceremony is a transcript that community managers can edit and publish via e-mail, on the on-line community's corresponding Web site, and in other publications as a result of strategic alliances 512 and syndication agreements 514.

7. Advertising Components

Figure 7:
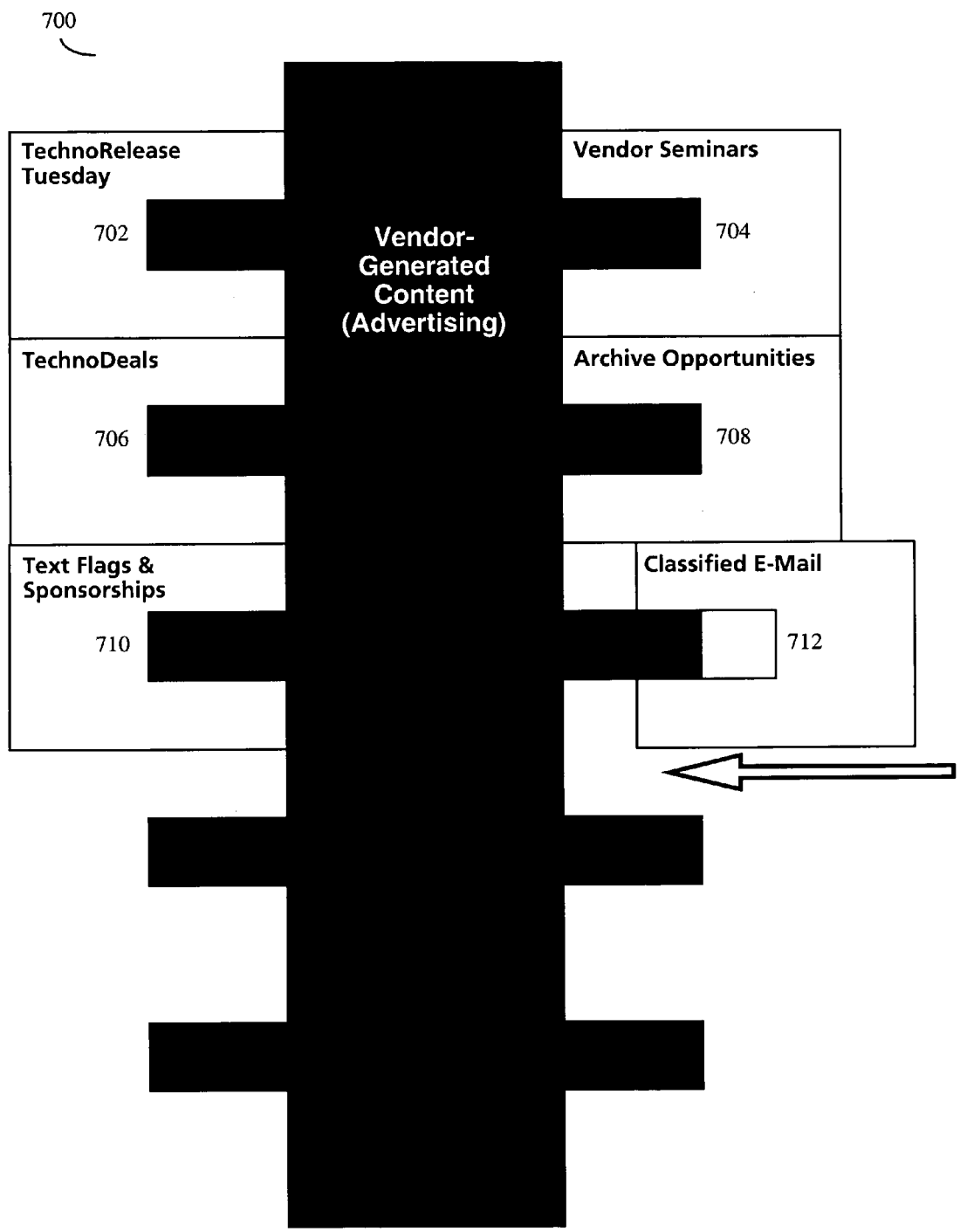
FIG. 7 illustrates exemplary components of the extensible information publishing architecture relating to advertising.

FIG. 7 illustrates exemplary components of the extensible information publishing architecture relating to advertising 700. The forms of Internet advertising 702, 704, 706, 708, 710, 712 depicted in FIG. 6 can generate revenue when used in conjunction with on-line communities developed in accordance with the invention herein. Because the advertising components 702, 704, 706, 708, 710, 712 are so tightly integrated within the extensible information publishing architecture, they: (1) do not suffer from time and space constraints; (2) come across to community members as more informational than promotional; (3) enable advertisers to interact and form one-to-one relationships with prospective and existing customers; and (4) excel at both customer acquisition and retention. As a result, these advertising components 702, 704, 706, 708, 710, 712 are more effective than existing forms of advertising.

With one exception, the advertising components 702, 704, 706, 708, 710, 712 involve the use of e-mail, not the unsolicited variety that has become known as "spam," but rather unique, personalized messages written for and sent to willing recipients in one or more on-line communities.

As discussed previously, advertisers can submit advertisements 63 via e-mail using a network access device 11 in conjunction with a computer network 10. The advertisements 63 are received by an e-mail server 31, which subsequently places them in a holding bin 70 in a database 32. A community manager 80 then uses a network access device 41 to assign values to the advertisements 63. Once values are assigned, the database 32 creates e-mail messages by matching these values with community member data 71 that members of the on-line community have voluntarily provided. The resulting messages are unique to each community member and consist of a combination of member-generated content 61 and advertisements 63, a combination of special guest content 62 and advertisements 63, or advertisements 63 alone. These e-mail messages are placed in an e-mail queue 72, which is periodically checked by the e-mail server 31. When the e-mail server 31 detects e-mail messages in the e-mail queue 72, it distributes them accordingly. Each of the advertising components 702, 704, 706, 708, 710, 712 is discussed in detail below.

(a) TechnoRelease Tuesday™ 702: TechnoRelease Tuesday™ 702 is an interactive advertising opportunity that enables companies to distribute technoreleases (i.e., news, special offers, tips, and other information) on a periodic basis, such as every Tuesday, via e-mail to the members of one or more online communities. The serial nature of TechnoRelease Tuesday enables advertisers to tell an ongoing story about their products and services, thereby developing a relationship with recipients, In addition, the use of e-mail means that vendors can make limited-time offers to community members that would not be possible with traditional advertising.

Community members easily can identify technoreleases because, like editorial programs 600, they feature a unique brand name (e.g., "TechnoRelease Tuesday™") and a descriptive slogan (e.g., "Corporate communication that teaches rather than preaches."). Because of the manner in which technoreleases plug into the extensible information publishing architecture 400 and because the information within technoreleases is more informational than promotional, community members view technoreleases as original content; not as advertising. As a result, TechnoRelease Tuesday™ 702 is a form of advertising that is not perceived as advertising by its target audience.

(b) Vendor Seminars 704: Vendor seminars 704 enable vendors to conduct a virtual trade show via e-mail in an online community to discuss one or more of their products and/or services and answer questions from community members. Running a vendor seminar 704 via e-mail in the context of an on-line community can cost significantly less and can reach a much larger audience than operating a booth at a trade show.

Advertisers can use vendor seminars 704 for many purposes, including the introduction of new products and/or services. Representatives can conduct the seminars by e-mail.

(c) TechnoDeals™ 706: TechnoDeals™ 706 includes an e-mail message periodically published to community members. Each TechnoDeals message contains a number of special deals (offers) from different companies. Placement is allotted on a first-come, first-served basis. As with TechnoRelease Tuesday 702, TechnoDeals 706 enables advertisers to make limited-time offers to community members that would not be possible with traditional forms of advertising.

(d) Archive Opportunities 708: As noted above and explained in more detail below, each on-line community operated in accordance with the invention can have a value-added archive 810 on the Web that includes previously published material plus supplemental and updated information supplied by the community managers. Several promotional opportunities 708 allow vendors to share in the benefits of a community's archive. For example, one opportunity enables vendors to purchase product-specific search buttons to make it easier for prospective customers to find relevant information and data about their products and/or services in the value-added archive. Community members can access these buttons by using a network access device 11 to click on a graphical user interface 304 displayed on their command center 300. When community members click on one of these buttons, the archive runs a query through the computer network 10 and pulls up information related to a particular product. If a vendor has participated, for example, in TechnoRelease Tuesday™ 702 or run a Vendor Seminar 704, buying a product-specific button can enhance the value of those previous advertising purchases.

(e) Text Flags and Sponsorships 710: Text Flags and Sponsorships 710 enable vendors to sponsor one or more on-line communities for a specified period of time. A sponsorship can include, for example, a short statement about one or more of the vendor's products and/or services placed inside one or more e-mail messages containing member-generated content 61 or editorial content 64 distributed to one or more on-line communities. Vendors can choose to sponsor member-generated content 500 or editorial programs 600. Community managers can distribute sponsored messages by using a network access device 41 in conjunction with the computer network 10.

(f) Classified E-Mail 712: This form of advertising works slightly differently from those listed above. Community members and other interested parties can purchase classified e-mail advertisements 712 by using a network access device 11 to click on a graphical user interface 303 displayed on their command center 300. Community members can apply their accumulated points 508 to such purchases. Those who purchase classified e-mail 712 can choose to place their advertisement under a specific topic (e.g., help wanted) or under a catch-all miscellaneous topic. At specified times, the database 32 compiles classified advertisements received from the Web server 34 into a highly-structured e-mail message and places it in a holding bin 70 where it waits approval from a community manager 80. Once approved, the database 32 creates e-mail messages by matching the classified advertisements with community member data 71 that members of the on-line community have voluntarily provided. The resulting messages are placed in an e-mail queue 72, which is periodically checked by the e-mail server 31. When the e-mail server 31 detects e-mail messages in the e-mail queue 72, it distributes them accordingly to the community members who have opted to receive classified advertising.

The foregoing advertising opportunities enable vendors to run sophisticated and highly targeted direct response advertising campaigns. Like community members, each vendor is provided with a command center 300 associated with its network access device 11 from which to coordinate and track its advertising campaigns. Additionally, vendors can set up a free Web-based e-mail account 440 for participating in one or more of the on-line communities. Vendors can access their free e-mail account 440 by using a network access device 11 to click on a graphical user interface 309 displayed on their command center 300.

8. Community Spin-Off Products and Services

The development of on-line communities in which members are tethered via e-mail results in a captive audience that community managers can contact at anytime. On-line communities with such an audience can generate revenue not only through the sale of editorial programs 600 and advertising 700, but also through the sale of community spin-off products and services 800.

There are two types of community spin-off products and services—those that grow organically from one or more on-line communities 802 and those developed by third parties 804 (FIG. 4). Third-party spin-off products and services 804 typically result from strategic alliances 402. In both cases, community managers seek products and services likely to appeal to the members of their respective community. Regarding internal development, community managers and affiliated others typically focus on creating products and services 802 that the members of most, if not all, on-line communities will find appealing. This universal appeal is not necessary with respect to third-party spin-off products and services 804 because the third parties bear the cost of development. Therefore, community managers can act more independently with respect to such products and services 804.

Community managers can sell community spin-off products and services 802, 804 to community members via e-mail by using a network access device 41 in conjunction with the computer network 10. Those e-mail messages can include editorial programs 600 like The TechnoGuest 618 (discussed above) or Netty Recommends, in which the community managers collectively review and recommend spin-off products and/or services 802, 804 based upon their actual experience and testing. As noted previously, Community members can purchase various spin-off products or services by using a network access device 11 to click on a graphical user interface 304, 305, 306, 307 displayed on their command center 300. Community members can apply their accumulated points 508 to such purchases.

Figure 8:
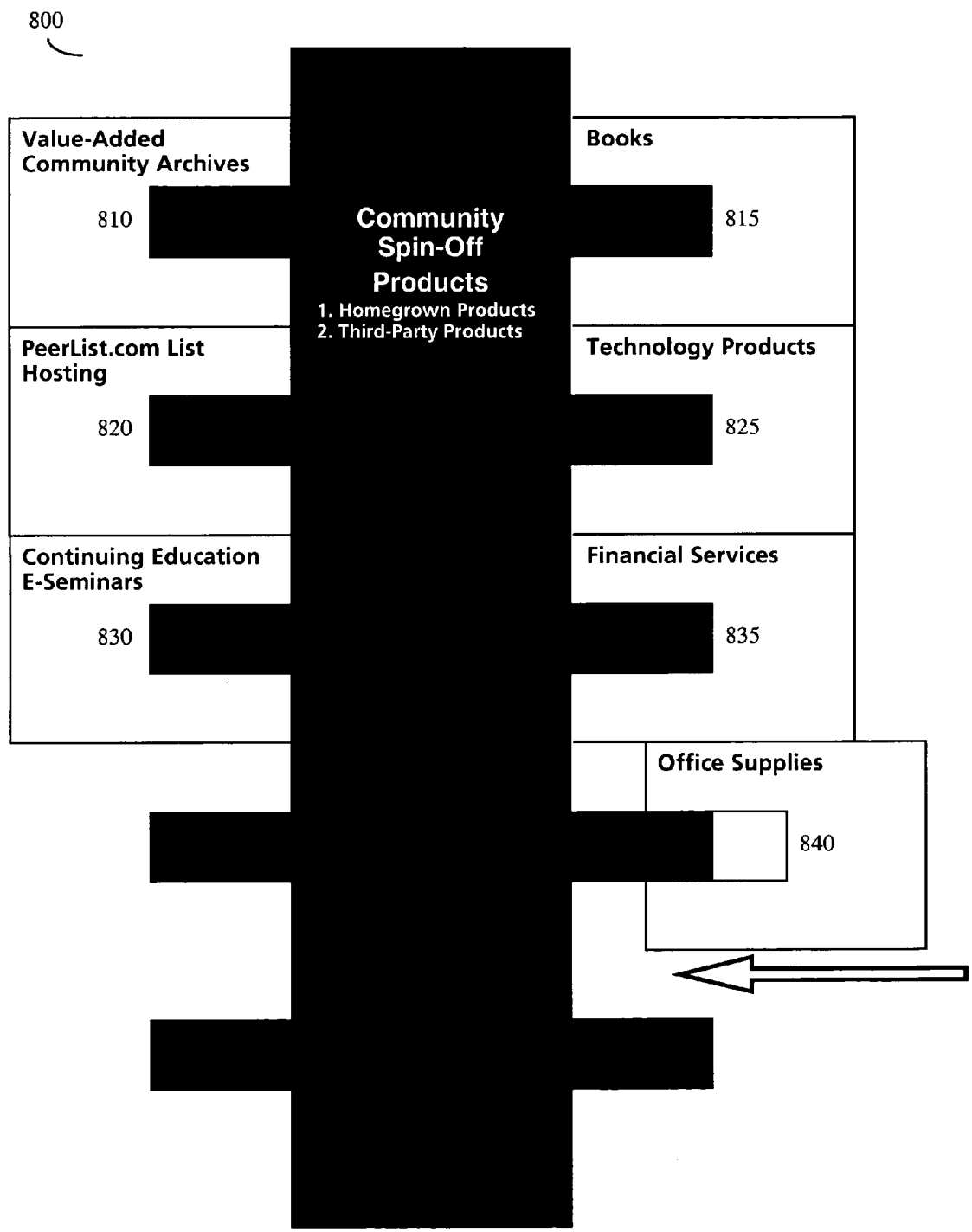
FIG. 8 illustrates exemplary components of the extensible information publishing architecture relating to community spin-off products and services.

FIG. 8 illustrates exemplary components of the extensible information publishing architecture relating to community spin-off products and services. These examples are described below.

(a) Value-Added Community Archives 810: Unlike other electronic documents, e-mail messages can be difficult to store and access. For example, some companies routinely delete all e-mail messages as a matter of policy. Also, many e-mail programs do not feature Boolean and other advanced search capabilities. As a result, many community members may find it difficult to save material and subsequently retrieve material from an on-line community.

To alleviate this problem and generate revenue at the same time, community managers can assemble value-added community archives 810 and charge an access fee. An archive 810 can contain the previously-published member-generated content 500, episodes of editorial programs 600, and advertising 700. In addition to previously-published member-generated content 500, an archive 810 can also contain member-generated content that community managers did not previously publish because of space constraints. To ensure the reliability of previously-published material, each archive 810 entry can feature an electronic pocket part to which community managers add updated and supplemental information. Finally, an archive 810 can feature several different search options, including, but not limited to, full-text, topic, product, author, date, and name of editorial program.

Community managers can publish and maintain each value-added community archive 810 by using a network access device 41 in conjunction with the computer network 10. Community members can purchase a subscription to a value-added community archive 810 by using a network access device 11 to click on a graphical user interface 304 displayed on their command center 300. During the subscription period, community members can conduct an unlimited number of searches. Alternatively, community members can purchase access to a value-added community archive 810 in the form of a one-time search by using a network access device 11 to click on a graphical user interface 304 displayed on their command center 300.

(b) PeerList.com™ List Hosting 820: As with value-added community archives 810, PeerList.com™ list hosting is a spin-off product 802 that stems naturally from the operation of on-line communities which revolve around e-mail. Small and middle market businesses that enjoy the information provided by one or more on-line communities run in accordance with the invention herein may find Internet mailing lists an excellent way to communicate and collaborate. For example, they can use the PeerList.com™ list hosting service 820 for internal bulletins, customer newsletters, press releases, team meetings, and much more. Community members can set up, pay for, and subsequently manage their own PeerList.com™ mailing lists by using a network access device 11 to click on a graphical user interface 305 displayed on their command center 300. PeerList.com™ mailing lists can operate through the computer network 10.

(c) Continuing Education Seminars 830: Professionals in many different industries must continue their education by taking accredited courses. To serve this need, community managers can set up and offer for sale continuing education seminars 830 that consist primarily of e-mail messages. Community members can purchase access to these seminars and receive credit by using a network access device 11 to click on a graphical user interface 306 displayed on their command center 300. Community members can apply their accumulated points 508 to such purchases. Upon registering for an e-seminar 830, community members begin receiving e-mail messages generated by the computer network 10.

(d) Third-Party Spin-Off Products and Services 815, 825, 835, 840: A wide variety of third-party community spin-off products and services 804 can be offered for sale to community members, including books 815, technology products 825, financial services 835, office supplies 840, and much more. As noted above, community members can purchase third-party spin-off products and services by using a network access device 11 to click on a graphical user interface 307 displayed on their command center 300. Community members can apply their accumulated points 508 to such purchases.

As a result of the aggregation of like-minded community members, community spin-off products 802, 804 can be sold with flexible pricing. As more community members use a network access device 11 to place an order as described above, the database 32 can adjust the price downward in accordance with prior programming entered, for example, by a community manager 80. The database 32 in conjunction with the e-mail server 31 can notify purchasers of such price adjustments via electronic mail and/or on the screen of their command center 300.

The extensible information publishing architecture 400 of the computer network 10 can accommodate additional information components. Thus, the foregoing description is exemplary and other implementations are within the scope of the invention.

What is claimed is:
1. An on-line publishing system comprising:
 a computer network including a plurality of network access devices, an electronic mail server, and a database,
 wherein community members can submit member-generated messages that include member-generated content by electronic mail and vendors can submit advertising by electronic mail, wherein the network is configured to pass the member-generated messages and the advertising to the electronic mail server which is configured to pass the member-generated messages and the advertising to the database for storage therein,
 wherein a community manager can review and assign values to the member-generated messages and the advertising stored in the database, and can assign values to editorial content stored in the database, wherein assigned values are indicative of the relevance of the member-generated messages, the advertising and the editorial content, respectively, to particular segments of an on-line community, and wherein the database is configured to generate individualized electronic mail text messages addressed to community members, wherein each individualized electronic mail text message includes information from one or more of the advertising, the member-generated content and the editorial content, wherein the individualized electronic mail text messages collectively include information from the advertising, the member-generated content and the editorial content, and wherein the information included in a particular individualized electronic mail text message depends on the assigned values and on data previously provided by a community member to whom the particular individualized electronic mail message is addressed.

2. The publishing system of claim 1 wherein at least some of the individualized electronic mail messages include information from the advertising as well as information from at least one of either the editorial content or the member-generated messages.

3. The publishing system of claim 1 wherein at least some of the advertising includes direct marketing advertising.

4. The publishing system of claim 1 wherein the database is configured to determine what information is included in the particular individualized electronic mail message by matching the assigned values with the data previously provided by the community member to whom the particular individualized electronic mail message is addressed.

5. The publishing system of claim 1 wherein each community member has a respective personal Web page from which that community member can control the data provided by the community member and used by the database to determine what information is to be included in the individualized electronic mail messages addressed to that community member.

6. The publishing system of claim 1 wherein the database is configured to award a predetermined number of points to a particular community member if information from an electronic mail message submitted by that community member is accepted for publication or syndication.

7. The publishing system of claim 6 wherein the network includes a transaction server and is configured to allow the community manager to offer products and services for sale to the community members, and wherein a particular community member can use previously-accumulated points toward the purchase of the products or services.

8. The publishing system of claim 6 wherein the network includes a transaction server and is configured to allow community members to initiate and complete a purchase of products or services via an electronic mail message and to apply previously-accumulated points toward the purchase of the products or services via electronic mail.

9. The publishing system of claim 1 wherein the network includes a transaction server and is configured to allow the community manager to offer products and services for sale to the community members, and wherein the database is configured to adjust a price for a particular product or service as the number of purchases by community members increases.

10. The publishing system of claim 1 wherein the database archives information included in individualized electronic mail messages previously distributed to community members, and wherein community members can subscribe and obtain access to the archived information.

11. The publishing system of claim 1 wherein information from the advertising that is included in individualized electronic mail messages appears in a format substantially the same as a format used for editorial programs to which community members can subscribe.

12. The publishing system of claim 1 wherein vendors pay a subscription price for the privilege of submitting advertising for review by the community manager.

13. The publishing system of claim 12 wherein information from at least some of the member-generated messages is syndicated.

14. The publishing system of claim 1 wherein special guests can submit special-guest messages by electronic mail, wherein the community manager can review and assign values to the special-guest messages, and wherein the database is configured to include information from the special-guest messages in specific individualized electronic mail messages based on the values assigned to the special-guest messages and based on the data previously provided by community members to whom the specific individualized electronic mail messages are addressed.

15. The publishing system of claim 14 wherein at least some of the individualized electronic mail messages include information from the advertising as well as from the special-guest messages.

16. The publishing system of claim 14 wherein the individualized electronic mail messages collectively include information from the advertising, the member-generated messages, the editorial content and the special-guest messages.

17. A method of publishing information, the method comprising:

receiving electronic mail messages from community members including member-generated content and receiving advertising submitted by vendors via electronic mail;

assigning values to the messages from the community members, the advertising and editorial content, wherein the assigned values are indicative of the relevance the messages, the advertising and editorial content, respectively, to particular segments of an on-line community;

automatically generating individualized electronic mail text messages addressed to community members, wherein each individualized electronic mail text message includes information from one or more of the advertising, the member-generated content received from community members and the editorial content, wherein the individualized electronic mail text messages collectively include information from the advertising, the member-generated content and the editorial content, and wherein the information included in a particular individualized electronic mail text message depends on the assigned values and on data previously provided by a community member to whom the particular individualized electronic mail message is addressed.

18. The method of claim 17 wherein at least some of the individualized electronic mail messages include information from the advertising as well as information from at least one of either the editorial content or the messages received from community members.

19. The method of claim 17 wherein the advertising includes direct marketing advertising.

20. The method of claim 17 including matching the assigned values with the data previously provided by the community member to whom the particular individualized electronic mail message is addressed.

21. The method of claim 17 including providing each community member with a respective personal Web page from which that community member can control the data provided by the community member and used by the database to determine what information is to be included in the individualized electronic mail messages addressed to that community member.

22. The method of claim 17 including awarding a predetermined number of points to a particular community member if information from an electronic mail message submitted by that community member is accepted for publication or syndication.

23. The method of claim 22 including:
offering products and services for sale to the community members; and
permitting a community member to use previously-accumulated points toward the purchase of the products or services.

24. The method of claim 22 including:
receiving an electronic mail message from a community member to purchase offered products or services and to apply previously-accumulated points toward the purchase of the products or services.

25. The method of claim 17 including:
offering products and services for sale to the community members via electronic mail; and
automatically adjusting a price for a particular product or service as the number of purchases of the particular product or service by community members increases.

26. The method of claim 17 including:
archiving information included in individualized electronic mail messages previously distributed to community members; and
allowing community members to subscribe and obtain access to the archived information.

27. The method of claim 17 including:
receiving electronic mail messages submitted by special guests;
assigning values to the special-guest messages; and
including information from the special-guest messages in specific individualized electronic mail messages based on the values assigned to the special-guest messages and based on the data previously provided by community members to whom the specific individualized electronic mail messages are addressed.

28. The method of claim 27 wherein at least some of the individualized electronic mail messages include information from the advertising as well as from the special-guest messages.

29. The method of claim 27 wherein the individualized electronic mail messages collectively include information from the advertising, the member-generated messages, the editorial content and the special-guest messages.

30. An article comprising a computer-readable medium including instructions for causing a computer system to generate individualized electronic mail text messages addressed to members of an on-line community, wherein each individualized electronic mail text message includes information from one or more of advertising submitted by vendors via electronic mail, member-generated content in electronic mail messages received from community members, and editorial content, wherein the individualized electronic mail text messages collectively include information from the advertising, the member-generated content and the editorial content, and wherein the information included in a particular individualized electronic mail text message depends on values assigned to the messages from community members, values assigned to the advertising from vendors and values assigned to the editorial content, wherein the assigned values are indicative of the relevance of the community member messages, the advertising and editorial content, respectively, to particular segments of the on-line community, and wherein the information included in the particular individualized electronic mail text message also depends on data previously provided by a community member to whom the particular individualized electronic mail text message is addressed.

31. The article of claim 30 wherein at least some of the individualized electronic mail messages include information from the advertising and at least one of either the editorial content or the community member messages.

32. The article of claim 30 wherein the advertising includes direct marketing advertising.

33. The article of claim 30 further including instructions for causing the computer system to match the assigned values with the data previously provided by the community member to whom the particular individualized electronic mail message is addressed.

34. The article of claim 30 further including instructions for causing the computer system to:
award a predetermined number of points to a particular community member if information from an electronic mail message submitted by that community member is accepted for publication or syndication, wherein the particular community member can use accumulated points toward the purchase of a product or service offered to members of the community.

35. The article of claim 30 further including instructions for causing the computer system to automatically adjust a price for a particular product or service offered for sale to community members as the number of purchases of the particular product or service by community members increases.

36. The article of claim 30 further including instructions for causing the computer system to archive information included in individualized electronic mail messages previously distributed to community members.

* * * * *